United States Patent [19]

Seymour et al.

[11] Patent Number: 5,226,172
[45] Date of Patent: Jul. 6, 1993

[54] METHODS FOR CONFIGURING AND PERFORMING 3-LEVEL PASSWORD SEARCHING IN A DISTRIBUTED COMPUTER SYSTEM

[75] Inventors: Leslie G. Seymour, Barrington, Ill.; Brian L. Matthews, Kent, Wash.

[73] Assignee: Motorola, Inc., Schaumburg, Ill.

[21] Appl. No.: 818,442

[22] Filed: Dec. 30, 1991

Related U.S. Application Data

[63] Continuation of Ser. No. 364,760, Jun. 12, 1989, abandoned.

[51] Int. Cl.$^5$ .............................. G06F 3/00; G06F 15/16
[52] U.S. Cl. ........................................ 395/800; 395/425; 380/4; 364/286.4; 364/286.5; 364/918.7; 364/969.4; 364/969.3; 364/DIG. 2
[58] Field of Search ................ 395/800, 425; 380/25, 380/4; 364/200

[56] References Cited

U.S. PATENT DOCUMENTS

| | | | |
|---|---|---|---|
| 4,672,572 | 6/1987 | Alsberg | 364/900 |
| 4,718,005 | 1/1988 | Feigenbaum et al. | 364/200 |
| 4,888,801 | 12/1989 | Foster et al. | 380/21 |
| 4,924,378 | 5/1990 | Hershey et al. | 364/200 |
| 4,959,860 | 9/1990 | Watters et al. | 380/4 |
| 4,995,112 | 2/1991 | Aoyama | 380/25 |
| 5,023,907 | 6/1991 | Johnson et al. | 380/4 |

OTHER PUBLICATIONS

H-P Journal, pp. 39-47 (Apr. 1988) "Adapting UNIX Logon Mechanisms to Automation Applications".

Primary Examiner—Thomas C. Lee
Assistant Examiner—Meng-Ai T. An
Attorney, Agent, or Firm—Walter W. Nielsen; Raymond J. Warren; Paul F. Wille

[57] ABSTRACT

A password scheme wherein a node is provided a configuration message at start-up which configures a shell of the node directing a search order of network password files. The node, group, and network password files are then transparently searched in the order specified by the configuration message.

2 Claims, 4 Drawing Sheets

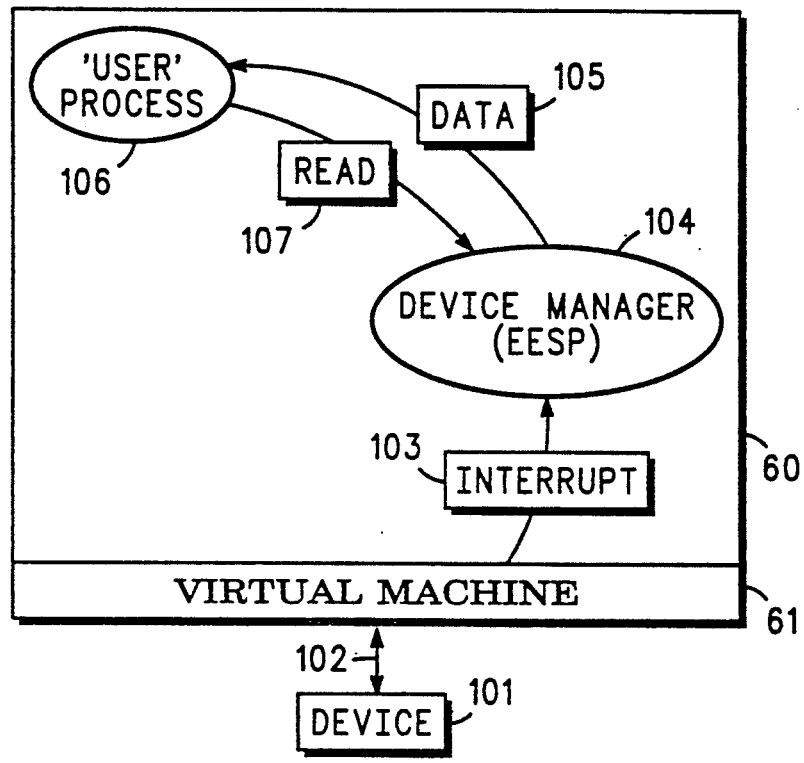
FIG. 5
FIG. 6
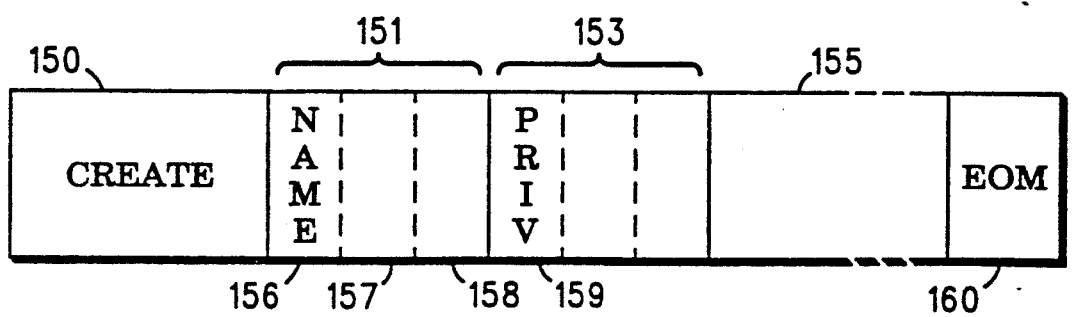

METHODS FOR CONFIGURING AND PERFORMING 3-LEVEL PASSWORD SEARCHING IN A DISTRIBUTED COMPUTER SYSTEM

This application is a continuation of prior application Ser. No. 07/364,760, filed Jun. 12, 1989, now abandoned.

RELATED INVENTIONS

The present invention is related to the following inventions, all assigned to the assignee of the present invention:

Nested Contexts in a Virtual Single Machine, invented by Andrew Kun, Frank Kolnick, and Bruce Mansfield, having Ser. No. 730,903, and filed on May 6, 1986 now abandoned;

Computer System with Data Residence Transparency and Data Access Transparency, invented by Andrew Kun, Frank Kolnick, and Bruce Mansfield, having Ser. No. 07/300,687, and filed on Jan. 19, 1989, this application being a continuation of Ser. No. 07/110,614, now abandoned, which was a continuation of Ser. No. 730,929, now abandoned;

Network Interface Module with Minimized Data Paths, invented by Bernhard Weisshaar and Michael Barnea, having U.S. Pat. No. 4,754,395, and issued on Jul. 5, 1988;

Method of Inter-Process Communication in a Distributed Data Processing System, invented by Bernhard Weisshaar, Andrew Kun, Frank Kolnick, and Bruce Mansfield, having U.S. Pat. No. 4,694,396, and issued on Sep. 15, 1987;

Logical Ring in a Virtual Single Machine invented by Andrew Kun, Frank Kolnick, and Bruce Mansfield, having U.S. Pat. No. 5,047,925 which issued Sep. 10, 1991;

Virtual Single Machine with Message-Like Hardware Interrupts and Processor Exceptions, invented by Andrew Kun, Frank Kolnick, and Bruce Mansfield, having U.S. Pat. No. 4,835,685 which issued May 30, 1989;

Computer Human Interface Comprising User-Adjustable Window for Displaying or Printing Information, invented by Frank Kolnick, having U.S. Pat. No. 5,062,060 which issued Oct. 29, 1991;

Computer Human Interface with Multi-Application Display, invented by Frank Kolnick, having Ser. No. 000,620, and filed on Jan. 5, 1987, now abandoned, and continuation Ser. No. 07/689,113, filed Apr. 22, 1991;

Object-Oriented Software Architecture Supporting Input/Output Device Independence, invented by Frank Kolnick, having Ser. No. 000,619, and filed on Jan. 5, 1987, now abandoned, and continuation Ser. No. 07/361,738, filed Jun. 2, 1989; and Process Creation and Termination Monitors For Use in a Distributed Message-Based Operating System, invented by Gabor Simor, having Ser. No. 000,624, and filed on Jan. 5, 1987, now abandoned, continuation Ser. No. 07/336,630, filed Apr. 7, 1989, now abandoned, and continuation Ser. No. 07/476,115, filed Jan. 29, 1990, now abandoned, and continuation Ser. No. 07/649,247, filed Jan. 31, 1991, now U.S. Pat. No. 5,060,150;

Computer Human Interface with Multiple Independent Active Pictures and Windows, invented by Frank Kolnick, having Ser. No. 000,626, and filed on Jan. 5, 1987, now abandoned;

Self-Configuration of Nodes in a Distributed Message-Based Operating System, invented by Gabor Simor, having Ser. No. 000,621, now U.S. Pat. No. 5,165,018;

Distributed Computer System with Network and Resource Status Management, invented by Leslie G. Seymour, having Ser. No. 294,037, now U.S. Pat. No. 5,109,486; and Distributed Computer System with Process Status Monitoring, invented by Leslie G. Seymour, having Ser. No. 318,101, and filed on Mar. 2, 1989 now abandoned.

FIELD OF THE INVENTION

The present invention relates, in general, to distributed computer systems and, more particularly, to a password scheme for use in distributed computer systems.

BACKGROUND OF THE INVENTION

The present invention is implemented in a distributed data processing system, which is a system consisting of two or more data processing systems which are capable of functioning independently but which are so coupled as to send and receive messages to and from each other.

A local area network (LAN) is an example of a distributed data processing system. A typical LAN comprises a number of autonomous data processing "nodes", each comprising at least a processor and memory. Each node is capable of conducting data processing operations independently. In addition, each node is coupled to a network of other nodes which may be, for example, a loop, star, tree, etc., depending upon the design considerations.

As mentioned above, the present invention finds utility in such a distributed data processing system, since there is a need in such a system for processes which are executing or which are to be executed in the individual nodes to share data and to communicate data among themselves.

A "process", as used herein is a self-contained package of data and executable procedures which operate on that data, comparable to a "task" in other known systems. Within the present invention a process can be thought of as comparable to a set (module) of subroutines in terms of size, complexity, and the way it is used. The difference between processes and subroutines is that processes can be created and terminated dynamically and can execute concurrently with their creator and other sets (modules) of "subroutines".

Within a process the data is totally private and cannot be accessed from the outside (i.e. by other processes). Processes can therefore be used to implement "objects", "modules", or other higher level data abstractions. Each process executes sequentially. Concurrent execution is achieved through multiple processes, possibly executing on multiple processors.

Every process in the distributed data processing system of the present invention has a unique identifier connector by which it can be referenced. The connector is assigned by the system when the process is created. The connector is used by the system to physically locate the process.

Every process also has a non-unique, symbolic "name", which is a variable-length string of characters. In general, the name of a process is known system-wide. To restrict the scope of names, the concept of a "context" is utilized. This concept is described in detail in copending U.S. patent applications having Ser. Nos. 000,621 now U.S. Pat. No. 5,165,018 and 000,624 cited in detail above. Basically, a context is a collection of related processes whose names are not known outside of the context.

A process in one context cannot symbolically communicate with, and does not know about, processes inside other contexts. All interaction across boundaries is by means of messages and pass through a "context process".

A "message" is a buffer containing data which tells a process what to do and/or supplies it with information it needs to carry out its operation. Messages are queued from one process to another by name or connector. Queuing avoids potential synchronization problems and is used instead of semaphores, monitors, etc. The sender of the message is free to continue after the message is sent. When the receiver attempts to get the message, it will be suspended until one arrives if none are already waiting in its queue. Optionally, the sender can specify that it wants to wait for a reply and is suspended until the specific message arrives. Messages from any other source are not dequeued until after that happens.

Messages provide the mechanism by which user transparency is achieved. A process located anywhere in the system may send a message to any other process anywhere within the system if the sending process has the receiving processes name or connector. This permits processes to be dynamically distributed across the system at any time and to gain optimal throughput without changing the processes to which they are referenced. Sending messages by connector obviates the need for a name search and ignores context boundaries. This is the most efficient method of communicating.

In the present invention messages are generally composed of a message ID and one or more "triples". The message ID is a word describing the purpose of the message (e.g. status) or the request (e.g. get) encoded in it. A triple is a data portion made of three fields. The first fields generally identify the type of triple. The second field indicates how many bytes of information are contained in the third field, which may be zero (0). The third field contains the data of the message, such as a process status code.

A problem in a distributed data processing system is the location of password files defining the users' permissions. Since there are generally a number of different nodes in a distributed system, it is desirable to allow a user to logon to the network from any of the nodes and be able to determine the user's permissions. An associated problem is where the system will look to find these password files.

Accordingly, it is an object of the present invention to provide a distributed computer system that overcomes the above deficiencies.

Another object of the present invention is to provide a distributed computer system which will transparently locate and access a password file to determine a user's access permissions.

Still another object of the present invention is to provide a distributed computer system which provides improved configurability of access by definitions at system start-up time.

SUMMARY OF THE INVENTION

A particular embodiment of the present invention comprises a distributed computer system having a plurality of nodes. Upon attempted access by a user, a search of various password files is conducted in an order specified by the system in a configuration message. The configuration message is sent to the processor upon connection to the distributed computer system. The search of the password files is conducted transparently.

BRIEF DESCRIPTION OF THE DRAWINGS

FIG. 5 shows the relationship between a user process and a resource process as they relate to the present invention;

FIG. 6 shows the standard format of a message in the distributed message-based data processing system of the type incorporating the present invention.

DETAILED DESCRIPTION OF THE DRAWINGS

Figure 1:
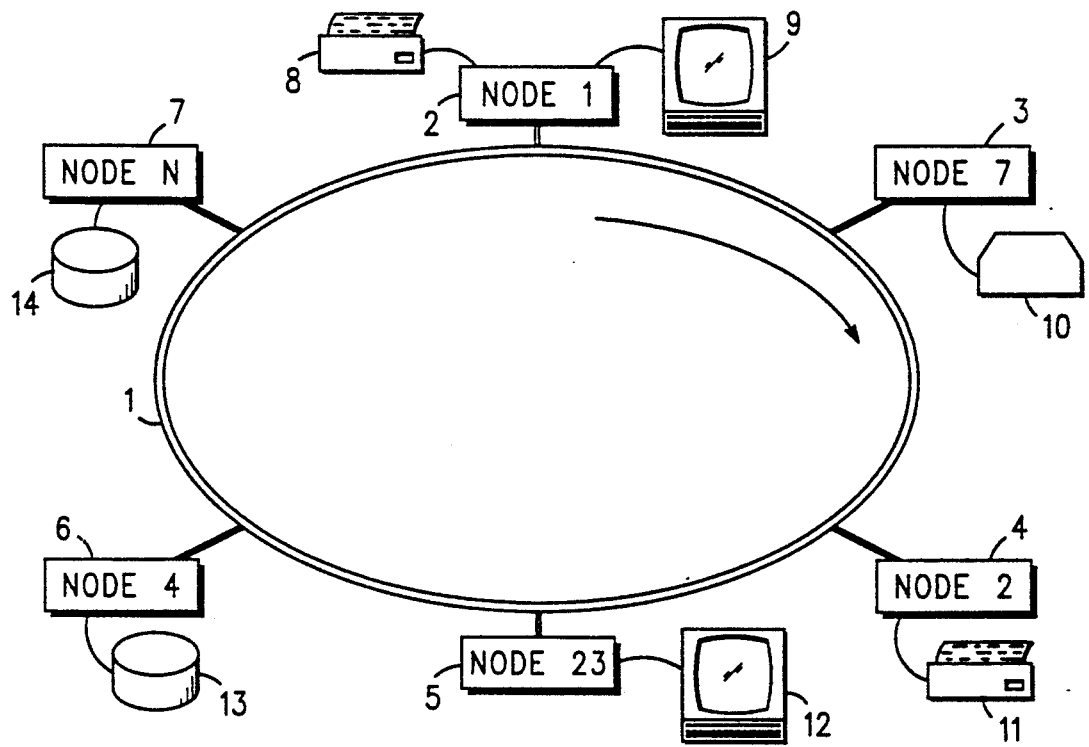
FIG. 1 shows a representational illustration of a single network, distributed message-based data processing system of the type incorporating the present invention.

FIG. 1 illustrates a single network, distributed, message-based, data processing system of the type incorporating the present invention. FIG. 1 comprises multiple nodes 2–7 loosely coupled by a local area network (LAN) 1. The number of nodes which may be connected to the network is arbitrary and depends upon the user application. Each node comprises at least a processor and memory, as will be discussed in greater detail with reference to FIG. 2, below. In addition, each node may also include other units, such as printers 8 and 11, operator display modules (ODM) 9 and 12, mass memory modules 13 and 14, and other I/O devices 10.

Figure 2:
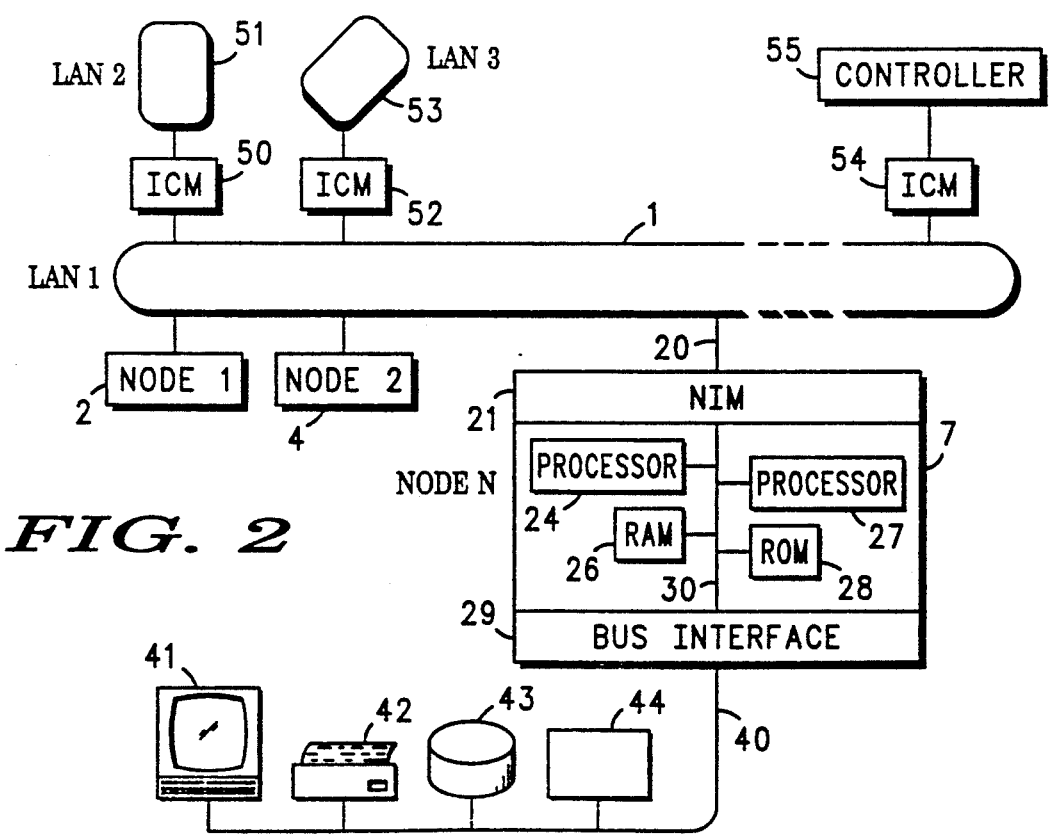
FIG. 2 shows a block diagram illustrating a multiple-network, distributed message-based data processing system of the type incorporating the present invention.

With reference now to FIG. 2, a multiple-network distributed computer configuration is shown. LAN 1 comprises several nodes 2, 4, and 7. LAN 1 is coupled to a second local area network 51 (LAN 2) by means of an Intelligent Communications Module (ICM) 50. Intelligent communications module 50 provides a link between the LAN and other networks and/or remote processors (such as programmable controllers).

LAN 2 may comprise several nodes (not shown) and may operate under the same LAN protocol as that of the present invention, or it may operate under any of several commercially available protocols, such as Ethernet; MAP (Manufacturing Automation Protocol); Systems Network Architecture (SNA); SECS-II; etc. Each ICM 50 is programmable for carrying out one of the above-mentioned specific protocols. In addition, the basic processing module of the node itself can be used as an intelligent peripheral controller (IPC) for specialized devices.

LAN 1 is additionally coupled to a third local area network 53 (LAN 3) via ICM 52. A process controller 55 is also coupled to LAN 1 via ICM 54.

A representative node N (7, FIG. 2) comprises a processor 24 which, in a preferred embodiment, is a processor from the Motorola 68000 family of processors. Each node further includes a read only memory (ROM) 28 and a random access memory (RAM) 26. In addition, each node includes a Network Interface Module (NIM) 21, which connects node 7 to LAN 1; and a Bus Interface 29, which connects node 7 to additional devices within node 7. While a minimal node is capable of supporting two peripheral devices, such as Operator Display Module (ODM) 41 and an I/O module 44, additional devices (including additional processors, such as processor 27) can be provided within a node. Other additional devices may comprise, for example, a printer 42 and a mass-storage module 43, which supports a hard disk and a back-up device (floppy disk or streaming tape drive). Operator display module 41 provides a keyboard and screen to enable an operator to input information and receive visual information.

While a single node may comprise all of the above units, in the typical user application individual nodes will normally be dedicated to specialized functions. For example, one or more mass storage nodes may be set up to function as data base servers. There may also be several operator consoles and at least one node for generating hard-copy printed output. Either these same nodes, or separate dedicated nodes, may execute particular application programs.

The system is particularly designed to provide an integrated solution for factory automation, data acquisition, and other real-time applications. As such, it includes a full complement of services, such as a graphical output, windows, menus, icons, dynamic displays, electronic mail, event recording, and file management. Software development features include compilers, a window-oriented editor, a debuger, and performance-monitoring tools.

The local area network, discussed with reference to FIGS. 1 and 2, ties the entire system together and makes possible the distributed virtual machine model described below. The LAN provides high throughput, guaranteed response, reliability, and low entry cost. The LAN is also autonomous, in the sense that all system and applications software are unaware of its existence. For example, a network interface module could be replaced without rewriting any software other than that which directly drives the NIM.

The LAN interconnection medium may be twisted-pair or coaxial cable. Two channels (logically, two distinct networks) may be provided for reliability and for increased throughput.

The LAN architecture is logical ring type. In a logical ring, an electronic "token" is constantly passed from node to node at high speed. The current holder of the token may use it to send a "frame" of data or may pass it on to the next node in the ring. The NIM only needs to know the logical address and status of its immediately succeeding neighbor. The NIM's responsibility is limited to detecting the failure of the neighbor or the inclusion of a new neighbor. The adjustment to failed or newly added nodes is automatic as described in copending patent application, Ser. No. 318,101, now abandoned referenced above.

The network interface maps directly into the processor's memory. Data exchange occurs through a dual-ported buffer pool which contains a linked list of pending "frames". Logical messages, which vary in length, are broken into fixed-size frames for transmission and are reassembled by the receiving NIM. Frames are sequence-numbered for this purpose. If a frame is not acknowledged within a preset period of time, it is retransmitted. The retransmission will repeat a preselected number of times before being treated as a failure.

As described above with reference to FIG. 2, the LAN may be connected to other LAN's operating under the same LAN protocol via so-called "bridgeways", or it may be connected to other types of LAN's via "gateways".

The computer operating system of the present invention operates upon processes, messages, and contexts, as such terms are defined herein. Thus, this operating system offers the programmer a hardware abstraction, rather than a data or control abstraction.

Processes are referenced without regard to their physical location via a small set of message-passing primitives. As mentioned earlier, every process has both a unique system-generated identifier and a not necessarily unique name assigned by the programmer. The identifier provides quick direct access, while the name has a limited scope and provides symbolic, indirect access.

Figure 3:
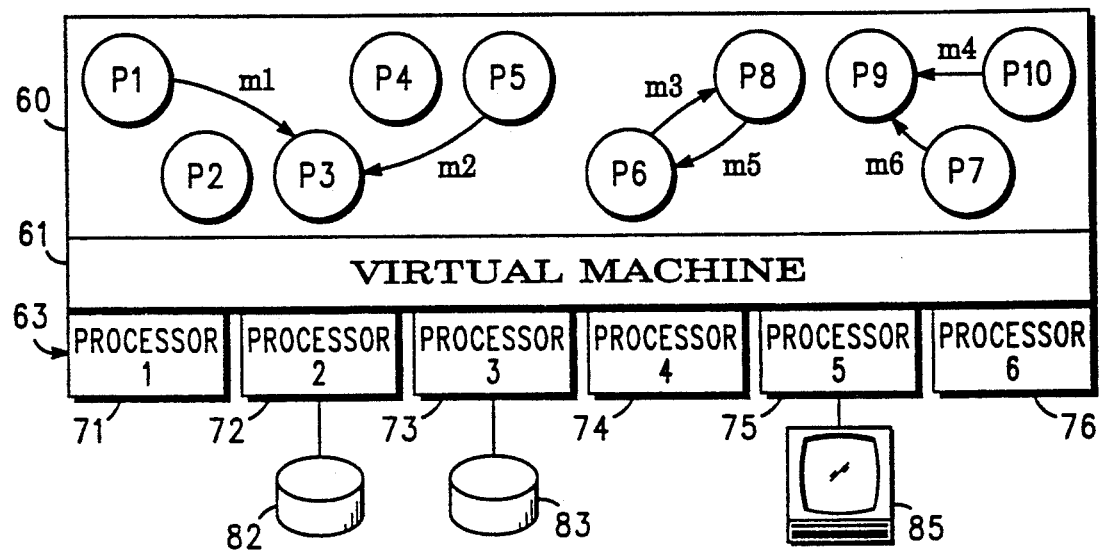
FIG. 3 shows an architectural model of a data processing system of the type incorporating the present invention.

With reference to FIG. 3, an architectural model of the present invention is shown. The bottom, or hardware, layer 63 comprises a plurality of processors 71–76. Processors 71–76 may exist physically in one or more nodes. The top, or software, layer 60 illustrates a number of processes P1–P10 which send messages m1–m6. The middle layer 61, labelled "virtual machine", isolates the hardware from the software, and it allows programs to be written as if they were going to be executed on a single processor. Conversely, programs can be distributed across multiple processors without having been explicitly designed for that purpose.

As discussed earlier, a "process" is a self-contained package of data and executable procedures which operate on that data. The data is totally private and cannot be accessed by other processes. There is no concept of shared memory within the present invention. Execution of a process is strictly sequential. Multiple processes execute concurrently and may be re-entrant, in which cases only one copy of the code is loaded even if multiple instances are active.

Every process has a unique "process identifier number" (PID) by which it can be referenced. The PID is assigned by the system when the process is created and remains in effect until the process terminates. The PID assignment contains a randomizing factor which guarantees that the PID will not be re-used in the near future. The contents of the PID are irrelevant to the programmer but are used by the virtual machine to physically locate the process. A PID may be thought of as a connector to a process.

Every process also has a "name" which is a variable-length string of characters assigned by the programmer. A name need not be unique, and this ambiguity may be used to add new services transparently and to aid in fault tolerance.

Figure 4:
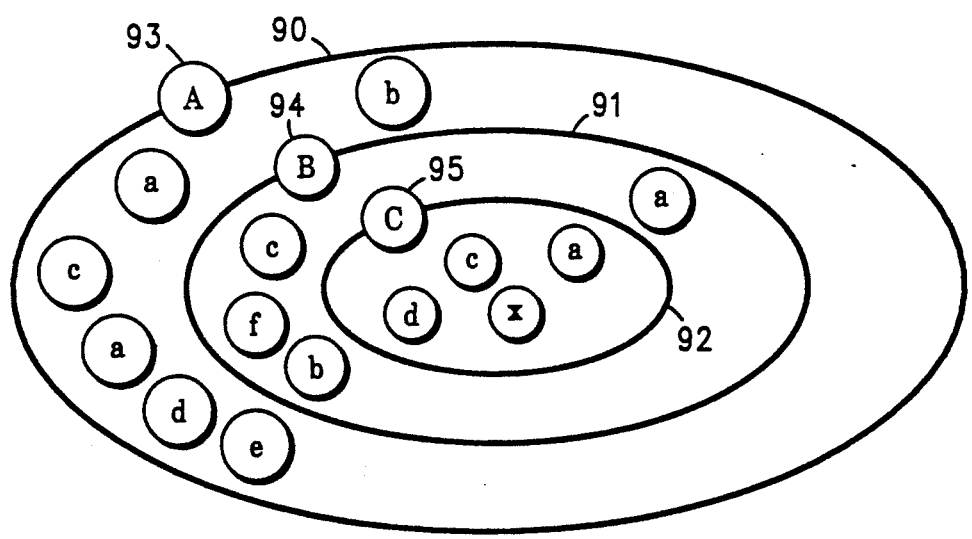
FIG. 4 shows the relationship between software contexts and processes as they relate to the present invention.

FIG. 4 illustrates that the system-wide name space is partitioned into distinct subsets by means of "contexts" identified by reference numerals 90–92. A context is simply a collection of related processes whose names are not known outside of the context. For example, context 90 contains processes A, a, a, b, c, d, and e. Context 91 contains processes B, a, b, c, and f; and context 92 contains processes C, a, c, d, and x.

One particular process in each context, called the "context process", is known both within the context and within the immediately enclosing context, called the "parent context". In the example of FIG. 4, processes A, B, and C are context processes for contexts 90, 91, and 92, respectively. The parent context of context 91 is context 90, and the parent of context 92 is context 91. Conceptually, the context process is located on the boundary of the context and acts as a gate into the context.

Processes inside context 92 can reference any processes inside contexts 90 and 91 by name. However, processes in context 91 can only access processes in context 92 by going through the context process C. Processes in context 90 can only access processes in context 92 by going through context processes B and C.

The function of the context processes is to filter incoming messages and either reject them or route them to other processes in its context. Contexts may be nested, allowing a hierarchy of abstractions to be constructed. A context must reside completely on one node. The entire system is treated as an all-encompassing context which is always present and which is the highest level in the hierarchy. In essence, contexts define localized protection domains and greatly reduce the chances of unintentional naming conflicts.

If appropriate, a process inside one context can be "connected" to a process inside another context by exchanging PIDs, once contact has been established through one or the other of the context processes. Most process servers within the present invention function that way. Initial access is by name. Once the desired function (such as a window or file) is opened, the user process and the service communicate directly via their PIDs.

A "message" is a variable length buffer (limited only by the processor's physical memory size) which carries information between processes. A header, inaccessible to the programmer, contains the destination name and the sender's PID as well as domain information of the sender. By convention, the first field in a message is a null-terminated string which defines the type of message (e.g., read, status, etc). Messages are queued to the receiving process when they are sent. Queuing ensures serial access and is used in preference to semaphores, monitors, etc.

Messages provide the mechanism by which hardware transparency is achieved. A process located anywhere in the virtual machine can send a message to any other process if it knows its name. Transparency applies with some restrictions across bridgeways (i.e., the interfaces between LANs operating under identical network protocols); and, in general, not at all across gateways (i.e., the interfaces between LANs operating under different network protocols) due to performance degradation. However, they could so operate, depending upon the required level of performance.

With reference now to FIG. 5, the relationship of external events to processes will now be described. The virtual machine makes devices look like processes. For example, when an interrupt occurs in an external device 101, the virtual machine kernel 61 queues an interrupt message 103 to specific process 104, known as an "External Event Service Process" (EESP), functioning as the device manager. For efficiency, the message is preallocated once and circulates between the EESP and the kernel. The message contains just enough information to indicate the occurrence of the event. The EESP performs all hardware-specific functions related to the event, such as setting control registers, moving data 105 to a user process 106, transmitting read messages 107 from the user process 106, etc., and then releasing the interrupt.

To become an EESP, a process issues a "connect" primitive specifying the appropriate device register(s). It must execute a "disconnect" before it exits. Device independence is achieved by making the message protocol between EESPs and applications processes the same wherever possible.

Referring now to FIG. 6, a block diagram representing the standard format of a message in the distributed message-based data processing system of the type incorporating the present invention is illustrated. The message format comprises a message ID portion 150; one or more "triples" 151, 153, and 155; and an end of message (EOM) portion 160. Each triple comprises a group of three fields, such as fields 156-158.

The ID portion 150 indicates that this message is "CREATE". This type of message is generally used to direct a process manager to create a resource manager to manage a resource object.

Field 156 of triple 151, the NAME designated field, specifies that the data field represents the name of the process to be created. Field 157 of triple 151 gives the size of the data field, which may be zero (0). Field 158 is the data field whose size is given in field 157. If the size of field 158 is zero, then field 158 does not exist.

A field 159 of triple 153, designated the PRIV field, specifies the access capabilities of accessing the resource object being created.

A message can have any number of triples. There can also be multiple triples in the same message containing PRIV fields, since several classes of users may be permitted access to the resource object being created.

As presently implemented, portion 150 is 16 bytes in length, field 156 is 4 bytes, field 157 is 4 bytes, field 158 is variable in length, and EOM portion 160 is 4 bytes.

The present invention is that of locating the password file when a user attempts to access the system. Since users in a network may often seek access from nodes other than their standard node and/or different users on different nodes may have the same name, it becomes a problem locating the correct password file which allows access and assigns the appropriate system status to the user.

The present invention accomplishes this task by configuring a shell, upon start up, to perform a search of password files of various operating levels. The first file searched would generally be the password file for that particular node. This file may be specifically designated or transparently designated.

Figure 7:
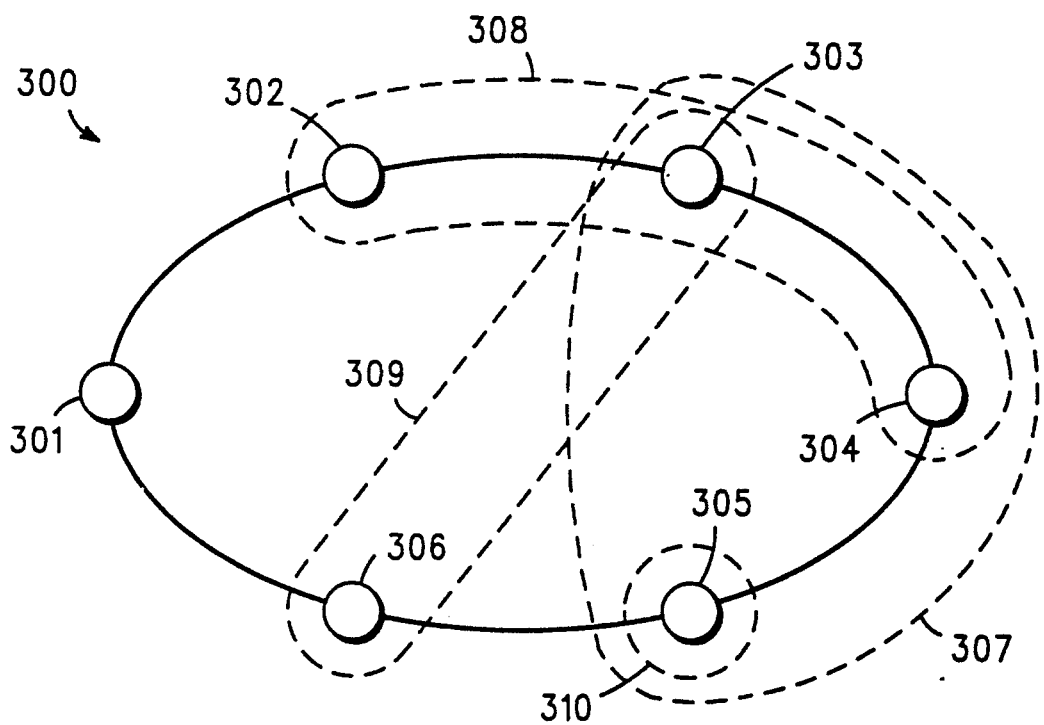
FIG. 7 is a graphical representation of a combination of nodes into a group password file.

If the user's name is not located in the node password file, the system may then be directed to search a node group password file. The node group password file will be a password file for a group of related nodes. This is shown graphically in FIG. 7 which illustrates a system, generally designated 300. System 300 consists of several nodes 301-306. These nodes are then assembled into groups 307-310. As shown, the group designations 307-310 may contain only one node, group 310, or may contain several nodes. In addition, one node may belong to more than one group (e.g. node 303 belongs to groups 307-309). The group names for a particular node are listed in the node-specific password file. The search for a group password file may be limited to a specific node or may be done transparently and cover all of the group password files in the network.

Finally, if the user is not located in either of the first two steps, the system may look to a default network password file. This default file would cover the entire network and would be accessed transparently to the user.

Therefore, a method and apparatus have been shown which provides a method of systematically and transparently searching password files at user logon.

Thus, it will be apparent to one skilled in the art that there has been provided in accordance with the invention, a process and method that fully satisfy the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. In a distributed data processing system comprising a plurality of n nodes interconnected in a network comprising groups, each group containing at least two nodes, wherein each of said nodes comprises at least a processing unit and a memory unit, said memory unit storing information including at least one process, and at least one of said nodes comprises input means enabling a system user to enter information into said system and display means for displaying information to said user, said at least one node also being part of at least one group of nodes, at least one group being part of said network, a method of permitting access to said system to said user upon request comprising the steps in sequence of:
   (a) entering a password by said user into said system via said input means, said password defining said user's right of access to utilize said system;
   (b) in response to entry of said password, utilizing said process stored in said memory unit of said at least one node to search a node specific password file located in the memory unit of said at least one node for said password, wherein the entered said password is compared with said node specific password file in order to determine said user's right of access to utilize said system;
      (i) if said password is found, granting access to said system to said user; otherwise denying access and proceeding to step (c) without a separate request therefor by said user;
   (c) utilizing said process stored in said memory unit of said at least one node to search a node group password file located in the memory unit of one of said nodes of said at least one group for said password;
      (i) if said password is found, granting access to said system to said user; otherwise denying access and proceeding to step (d) without a separate request therefor by said user;
   (d) utilizing said process stored in said memory unit of said at least one node to search a default network password file located in the memory unit of one of said nodes of said network for said password; and
      (i) if said password is found, granting access to said system to said user; otherwise denying access and terminating said search.

2. In a distributed data processing system comprising a plurality of n nodes interconnected in a network comprising groups, each group containing at least two, wherein each of said nodes comprises a shell, and wherein each of said nodes further comprises at least a processing unit and a memory unit, said memory unit storing information including at least one process, and at least one of said nodes comprises input means enabling a system user to enter information into said system and display means for displaying information to said user, said at least one node also being part of at least one group of nodes, a method of permitting access to said system to said user upon request by searching password files contained in successively broader groupings of said nodes for a password file containing a password matching that which is entered by a system user, said method comprising the steps in sequence of:
   (a) utilizing one of said processing units of said system, sending to one of said shells a configuration message which specifies an order in which searching is to be performed, said order being to search first within said at least one node, next within said at least one group, and finally within said network;
   (b) utilizing said one processing unit of the node corresponding to said one shell to configure said shell to perform said search of password files in the order specified in said configuration message;
   (c) entering a password by said user into said system via said input means, said password defining said user's right of access to utilize said system;
   (d) in response to entry of said password, utilizing said process stored in said memory unit of said at least one node to search a node specific password file located in the memory unit of said at least one node for said password wherein the entered said password is compared with said node specific password file in order to determine said user's right of access to utilize said system;
      (i) if said password is found, granting access to said system to said user; otherwise denying access and proceeding to step (e) without a separate request therefor by said user;
   (e) utilizing said process stored in said memory unit of said at least one node to search a node group password file located in the memory unit of one of said nodes of said at least one group for said password;
      (i) if said password is found, granting access to said system to said user; otherwise denying access and proceeding to step (f) without a separate request therefor by said user;
   (f) utilizing said process stored in said memory unit of said at least one node to search a default network password file located in the memory unit of one of said nodes of said network for said password; and
      (i) if said password is found, granting access to said system to said user; otherwise denying access and terminating said search.

* * * * *

UNITED STATES PATENT AND TRADEMARK OFFICE
CERTIFICATE OF CORRECTION

PATENT NO. : 5,226,172

DATED : July 6, 1993

INVENTOR(S) : Leslie G. Seymour, et al

It is certified that error appears in the above-indentified patent and that said Letters Patent is hereby corrected as shown below:

Column 10, line 6, claim 2, insert --nodes-- after the word "two".

Signed and Sealed this

Third Day of May, 1994

Attest:

BRUCE LEHMAN

Attesting Officer

Commissioner of Patents and Trademarks